United States Patent
Kruecken

(10) Patent No.: US 9,582,281 B2
(45) Date of Patent: Feb. 28, 2017

(54) DATA PROCESSING WITH VARIABLE OPERAND SIZE

(75) Inventor: Joachim Kruecken, Munich (DE)

(73) Assignee: NXP USA, INC., Austin, TX (US)

( * ) Notice: Subject to any disclaimer, the term of this patent is extended or adjusted under 35 U.S.C. 154(b) by 543 days.

(21) Appl. No.: 13/201,077

(22) PCT Filed: Mar. 31, 2009

(86) PCT No.: PCT/IB2009/051345
§ 371 (c)(1),
(2), (4) Date: Aug. 11, 2011

(87) PCT Pub. No.: WO2010/112970
PCT Pub. Date: Oct. 7, 2010

(65) Prior Publication Data
US 2012/0151189 A1    Jun. 14, 2012

(51) Int. Cl.
*G06F 9/30*    (2006.01)

(52) U.S. Cl.
CPC ...... *G06F 9/30192* (2013.01); *G06F 9/30105* (2013.01); *G06F 9/30112* (2013.01)

(58) Field of Classification Search
CPC ............. G06F 9/30105; G06F 9/30192; G06F 9/30112
USPC ........................................................ 712/226
See application file for complete search history.

(56) References Cited

U.S. PATENT DOCUMENTS

| | | | |
|---|---|---|---|
| 4,646,477 A | 3/1987 | Robertson | |
| 4,649,477 A | 3/1987 | MacGregor et al. | |
| 4,679,140 A | 7/1987 | Gotou et al. | |
| 6,802,017 B1 * | 10/2004 | Takayama et al. | 713/324 |
| 7,191,318 B2 | 3/2007 | Tripathy et al. | |
| 2003/0172252 A1 | 9/2003 | Henry et al. | |
| 2004/0181653 A1 | 9/2004 | McGrath et al. | |
| 2005/0033940 A1 | 2/2005 | McGrath | |
| 2005/0166036 A1 | 7/2005 | Catherwood et al. | |
| 2007/0300047 A1 | 12/2007 | Alfano et al. | |
| 2008/0148019 A1 | 6/2008 | Coke et al. | |

FOREIGN PATENT DOCUMENTS

WO    2005/013118 A2    2/2005

OTHER PUBLICATIONS

Hennessy et al., "Computer Architecture a Quantitative Approach", 2003, Morgan Kaufmann Publishers, 3rd ed, Appendix E p. E-12.*
ARM Architecture Reference Manual, 2008, ARMv7-A & ARM v7-R ed., § B4.6.18, pp. B4-51 to -53.*
International Search Report and Written Opinion correlating to PCT/IB2009/051345 dated Dec. 16, 2009.

(Continued)

*Primary Examiner* — Andrew Caldwell
*Assistant Examiner* — Yuqing Xiao

(57) ABSTRACT

A method of processing data comprising performing a sequence of operation instructions with variable operand size, wherein respective size codes for different source and destination operands are obtained and registered separately from performing the sequence of operation instructions, and the sequence of operation instructions is performed using operand sizes defined by the registered size codes, the operation instructions of the sequence not themselves containing size codes.

17 Claims, 3 Drawing Sheets

(56) References Cited

OTHER PUBLICATIONS

Zelenovsky et al.; "AMD 64-bit architecture (x86-64)"; Oct. 27, 2004; Hardware Secrets, LLC downloaded from <<http:www.hardwaresecrets.com/printpage/AMD-64-bit-architecture-x86-64/56>> on Apr. 1, 2014, 3 pages.

Hennessy, D. et al.; "Appendix B: Instruction Set Principle and Examples," from Computer Architecture: A Quantitative Approach, Fourth Edition, 2007 Morgan Kaufman Publishers; 49 pages.

Hennessy, D. et al.; "Appendix K: Survey of Instruction Set Architectures," from Computer Architecture: A Quantitative Approach; downloaded from <<http://booksite.mkp.com/9780123838728/references/appendix_k.pdf>> on Jun. 26, 2014, 91 pages.

* cited by examiner

DATA PROCESSING WITH VARIABLE OPERAND SIZE

FIELD OF THE INVENTION

This invention relates to a data processor and to a method of processing data with variable operand size.

BACKGROUND OF THE INVENTION

A data processor functions in response to machine code instructions. A machine code instruction set may have all instructions of the same length, or may have variable-length instructions. How the machine code instructions are organized depends largely on the specification of the machine code. Common to most organisations is the division of the instruction into one field, the opcode (operation code) which specifies the exact operation (for example "add") and other fields, which may give the type of the operands, their location, or their value directly (operands contained in an instruction are called immediate). The specification and format of the instructions are laid out in the instruction set architecture of the processor in question (which may be a general central processor unit ('CPU') or a more specialized processing unit). The location of an operand may be a register or a memory. The types of operations may include arithmetics, logical operations and data instructions including display or print characters for example, as well as special instructions (such as CPUID and others) and program control.

U.S. Pat. No. 4,649,477 describes certain issues arising with instruction execution in a typical data processor, such as a microcontroller or a microprocessor. The instructions are partitioned into functional routines. These routines perform either a portion of the instruction or the entire instruction, depending on the instruction's complexity. An example is the fetch effective address routine which calculates an effective address and then fetches the sized operand from that address. To perform this operation, it is necessary to provide size information during the address calculation operation. The size is also needed by the bus controller to determine the size of the operand to be fetched from memory. These routines require that the instruction be decoded to reflect the size of the operand to be fetched. Similarly, the instruction operation routine which performs the operation on the operands for the instruction may require their size.

In a machine which performs operations on various sized operands that is controlled by a control structure, it is possible to provide different control sequences for each sized operation. This technique is inefficient, however, for while it is necessary to provide separate control for those operations larger than the size of the available resources, it would be preferable that all sizes less than or equal to those resources should share control sequences and allow secondary decoding of the instruction and provide the determination as to which size should occur.

If there is sharing of code sequences for multiple operations as well as multiple operand sizes, the constraints become more stringent. As an example, there are functional routines provided to evaluate an effective address and to fetch the sized operand. U.S. Pat. No. 4,649,477 refers to data processors having a 16 bit data bus in which there are two different routines, one to fetch a long word operand and the other to fetch a byte or a word operand depending upon the size of the operation. These routines can be called in the execution of any instruction.

U.S. Pat. No. 4,649,477 refers to data processors which perform operations on operands which have their size or length specified as part of the instruction, the operand and register size being controlled implicitly. The size of the operation normally reflects the size of the operand to be operated on for an instruction. There are three operand sizes handled in the examples of processors referred to, namely 8-, 16- and 32-bit operands to perform byte, word and long word operations, respectively. The control used to perform sized operations is derived from the instruction and affects the execution unit, condition codes in the condition code register, the data bus and the bus controller. Other operand sizes are also possible, notably 64-bit, for example.

U.S. Pat. No. 4,649,477 proposes a data processor which has an instruction register for storing an instruction which selects the operation to be performed on the operand and the size of the operand, and a size controller for selectively enabling either the instruction register or another functional block, or a size selector to select the size of the operand so as to allow both implicit residual size control, where the size is calculated by one of several control units, and explicit size control, where the size is selected or forced by the size selector.

U.S. Pat. No. 4,649,477 aims in this way to achieve a simplification in the internal state machine based on selecting the operand sizes by an internal size bus where different sized operands are needed. However, when employing explicit control it applies the same operand size to each register and does not enable dynamic switching of the register sizes, that is to say making the register size part of a task state.

SUMMARY OF THE INVENTION

The present invention provides a data processor and a method of processing data as described in the accompanying claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1:
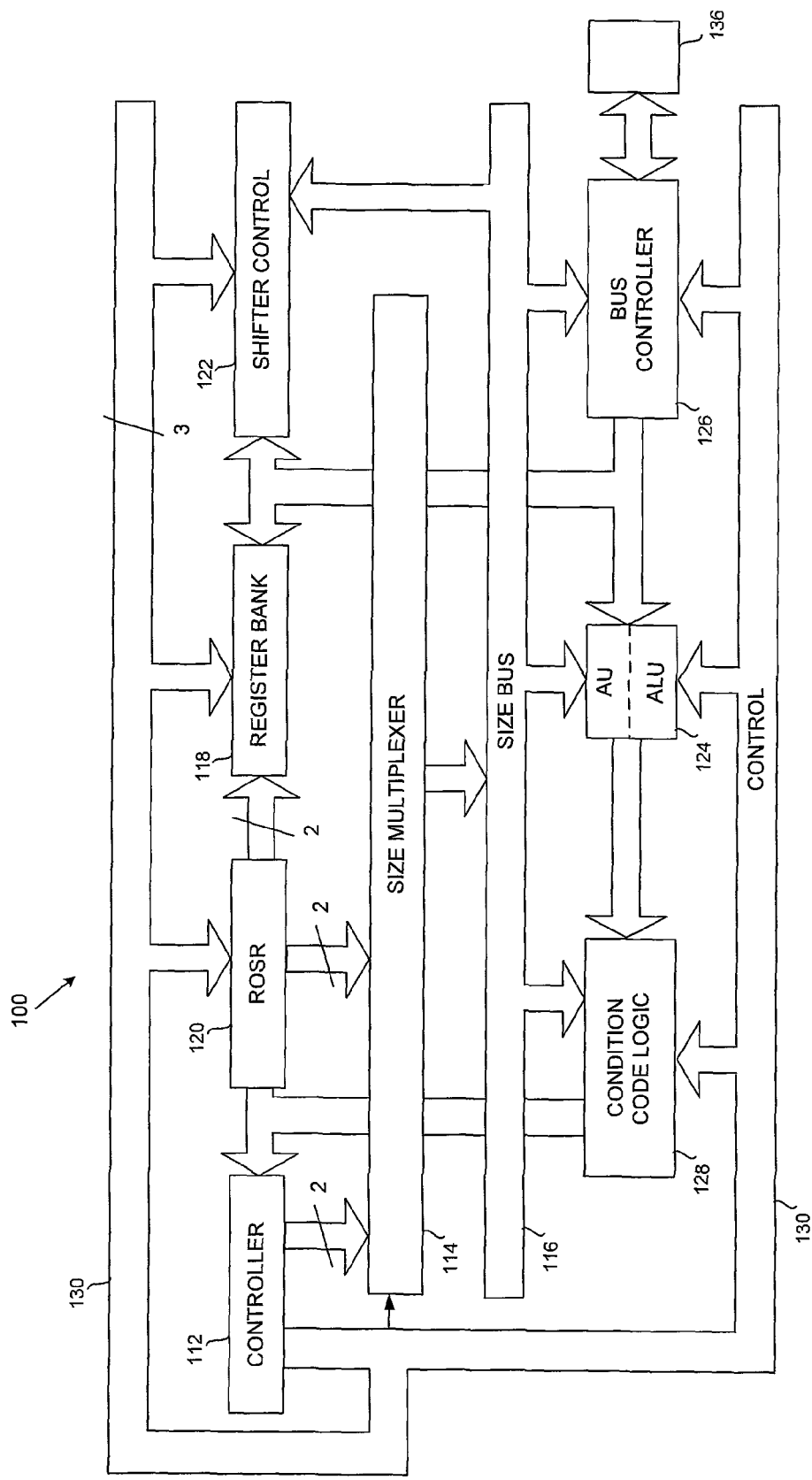
FIG. 1 is a block schematic diagram of a data processor in accordance with one embodiment of the invention, given by way of example.

FIG. 1 shows schematically the general architecture of a typical data processor 100 to which one embodiment of the invention is applied.

In a data processor, such as a microprocessor for example, the effective size of general purpose registers such as a register bank 118 is often set as a static attribute for each register, for example 8-bit, 16-bit or 32-bit. Effective size means that only the least significant bits ('LSBs') selected by the size attributes are used by the computation and load/store instructions and some most significant bits ('MSBs') not covered by a register's attribute may be ignored. In prior data processors, in order to avoid having to provide different control sequences for each sized operation, operand size is coded as part of the instruction.

The instruction coding in a microcontroller typically requires one or more bits to code the operand size. In the above example, of 8-, 16-, 32-bit operand sizes, 3 codes out of 4 possible codes for 2 bit positions are required and consume effectively 1.5 bits of the operating instructions. In many 16-bit controllers, such as the S12-16 microprocessor of Freescale Semiconductor, Inc. for example, the majority of op-codes are only 8-Bit wide, so these 1.5 bits consume a major portion of the available code space. Also, for a 16-Bit op-code like on the ColdfireV1 or PowerPC microprocessors of Freescale Semiconductor, Inc., and even for 32-bit controllers such as ARM, it is a significant portion of the available code space, resulting in reduction of code density for the operational instructions.

Another effect is that parts of a typical application program in a multitasking system have different properties with respect to the operand sizes needed. For example, an interrupt handler mainly uses 8 or 16 Bit wide operands, while other tasks heavily using mathematical operations prefer 32-Bit operations. Many controllers today have a fixed set of fixed registers This embodiment of the present invention provides a method of processing data with comprising performing a sequence of operation instructions with variable operand size. Respective size codes for different source and destination operands are obtained and registered separately from performing the sequence of operation instructions, and the sequence of operation instructions is performed using operand sizes defined by the registered size codes, the operation instructions of the sequence not themselves containing size codes.

This embodiment of the present invention also provides a data processor for performing a sequence of operation instructions with variable operand size. The data processor includes a size code register module 120 for receiving and registering respective size codes for different source and destination operands separately from performing the sequence of operation instructions, and a processing module 236 for performing the sequence of operation instructions using operand sizes defined by the size codes registered in the size code register module 120, the operation instructions of said sequence not themselves containing size codes.

The respective operand size attributes for each operand register of the register bank 118, in this example of 8-, 16-, 32-bit operand sizes coded by 2 bits per source/destination register, are contained in a special Register & Operand Size register ('ROSR') 120 and can be set or modified by code inserted by the compiler intermittently, as required by the task context, without the size code information having to form part of every routine or sub-routine. In this embodiment of the invention, obtaining and registering the respective size codes is performed before performing the instruction sequence and in fact can be performed dynamically at runtime of the sequence of operation instructions.

The ROSR 120 specifies the size of the data registers of the bank 118 and hence at the same time the size of the operand. Instead of having the operand size in each instruction of the sequence, the operand size is associated with the register. The operand field of each instruction has the address information (register name or number) identifying the register to operate on, but no size code for the register nor the operand. Using this address information, the load store unit then picks the size from the ROSR 120, as if it were a look-up table. In this way effective sizes for memory or register and for operands of load/store and computation instructions are implicitly defined by the selection of their source or destination register. This eliminates the need to have multiple versions of the instruction routines and sub-routines for different operand sizes.

In typical programs general purpose registers are used continuously with a certain operand size (for example 8-bit, 16-bit or 32-bit) for longer sequences of instructions (10s to 100s). Specifying this size again and again throughout such a sequence means that instruction words carry redundant information. By setting the size codes in the ROSR 120 intermittently, notably at the beginning of such sequences, a single instruction within the code stream sets the register and operand sizes statically for the whole sequence.

The ROSR holds the size information and can be reconfigured on the fly. In addition to improving the code size and code density, the controller performance may be increased, since only as much information is loaded and stored as needed. This means, for example, that 32 bits are not loaded and operated wastefully when only 8 or 16 bits are required. This has a positive effect on energy consumption also.

In U.S. Pat. No. 4,649,477 both implicit residual size control and explicit size control are allowed. However, even when employing explicit size control, in the system of U.S. Pat. No. 4,649,477, all the instructions still contain size codes for the operand and register sizes, which the present invention sets only intermittently, releasing code bits for operators and operands.

In more detail, the data processor 100 is shown in FIG. 1 as comprising a controller 112 which controls the operation of the different modules of the data processor over a control line 130. In this example, the data processor includes also a shifter control module 122, an arithmetic and arithmetic/logic module 124, a bus controller 126 and a condition code logic module 128 controlled by the controller 112 over the line 130. The bus controller receives instructions from an external resource 136, including a compiler/decompiler, to which it also transmits data.

Register and operand size code, inserted by a compiler for example, is obtained and received and stored in the ROSR 120 and provided to a size multiplexer 114. In response to a control signal from the controller 112, the size multiplexer 114 provides register and operand size information over a size bus 116 to the other modules of the data processor.

The bus controller 126 communicates the instructions from the external resource to the register bank 118 the shifter control module and the arithmetic/logic module 124. The arithmetic/logic module 124 performs a sequence of operations on the operand in dependence on the operand size defined by the information from the size multiplexer 114.

Figure 2:
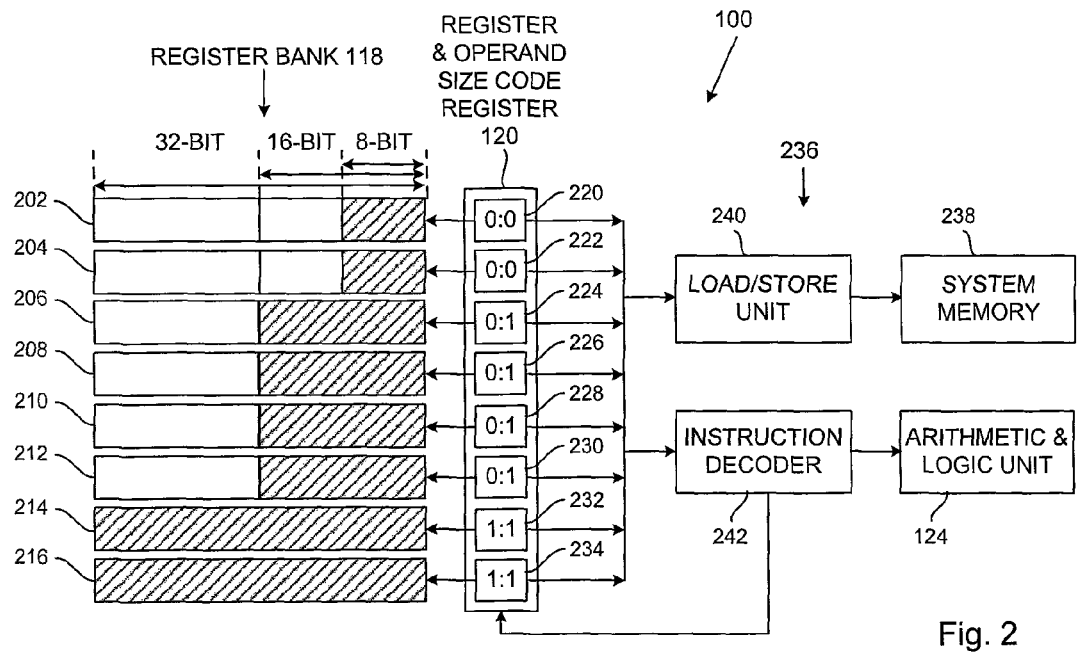
FIG. 2 is a schematic diagram of registers in the data processor of FIG. 1 in one configuration of usage.
Figure 3:
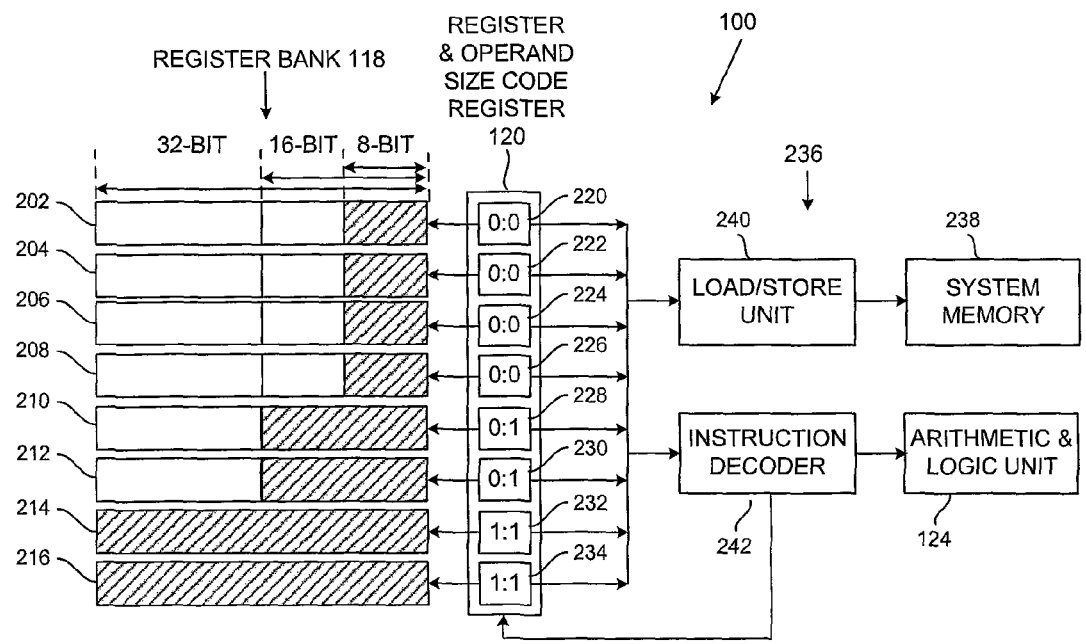
FIG. 3 is a schematic diagram of registers in the data processor of FIG. 1 in another configuration of usage.

FIGS. 2 and 3 show the elements closely associated with the register and operand size information in more detail. In this example the register bank 118 includes eight registers 202 to 216 of variable effective size, up to 32-bit. The ROSR 120 comprises the same number of size code register elements 220 to 234 as the number of registers in the register bank 118. In this example, each of the ROSR register elements 220 to 234 is a 2-bit element, enabling up to four size codes to be registered for the corresponding one of the registers 202 to 216. The data processing module of the data processor, shown schematically at 236, performs the operation routines and sub-routines in a sequence of operation instructions longer than the operands. The processing module 236 includes system memory 238, a load/store unit 240 which transfers data between the register bank 118 and the memory and the system memory 238. The processing module 236 also includes an instruction decoder 242 for receiving and decoding the operation routines and sub-routines in the sequence of operation instructions. It will be appreciated that the structure shown is simplified for clarity and typically the data processor structure would be more complex and that elements shown in FIG. 1 may also form parts of elements shown in FIGS. 2 and 3.

In use, the effective sizes of each of the registers 202 to 216 and hence the operand sizes are set at the start of an operating instruction sequence by the 2-bit codes registered in the ROSR elements 220 to 234. The register and operand size is set as part of the task context, so the compiler can choose the register layout as a function of the type of task to optimize it to the attributes of a task or even a subroutine. This means routines which need a lot of 32-Bit operands can be chosen to have a larger amount of 32-Bit registers, while others doing character processing, for example, on a byte basis can be chosen to have a larger amount of 8-Bit operands.

The following example below illustrates a potential usage of the ROSR 120 for two different types of task

```
char_fun:           ; Entry into a function requiring a lot of character processing
push   rosr         ; store the actual size information on Stack for future retrieval
mov    #sz66668888,rosr   ; select e.g. four 16-Bit wide and four 8-Bit wide
registers
ld     d0,char1     ; now loads a byte from the memory [1]
 ...
(many character processing operations, heavy use of 8-Bit data)
 ...
pull   rosr         ; restore the previous size information
rts                 ; return from subroutine
-------------------- other function
math_fun:           ; Entry to a to a function requiring a lot of 32-Bit processing
push   rosr         ; store the actual size information on Stack for future retrieve
mov    #sz66662222,rosr   ; select e.g. four 16-Bit wide and four 32-Bit wide
registers
ld     d0,float     ; now loads a 32-Bit word from the memory [2]
 ...
(many arithmetic processing operations, heavy use of 16-Bit data)
 ...
pull   rosr         ; restore the previous size information
rts                 ; return from subroutine
```

In function [2] the same instruction code as in [1] now loads a 32-Bit value instead of an 8-Bit one. The change of size code can be input by the compiler when a sequence of instructions can most appropriately be performed with a different register and operand size. Restoring the previous size code enables the size to be correct for the calling context even though the compiler is unaware of the context.

Since also Store instructions are required with the same attribute, size coding in the instruction code would consume 48 combinations, which would represent about 19% of the available combinations for an 8-Bit wide instruction code, whereas with this embodiment of the present invention, in the example given, size coding consumes 16 combinations equivalent to about 6% of the available combinations. The combinations freed up can be used to code more instructions in the compact 8-Bit format.

Figure 4:
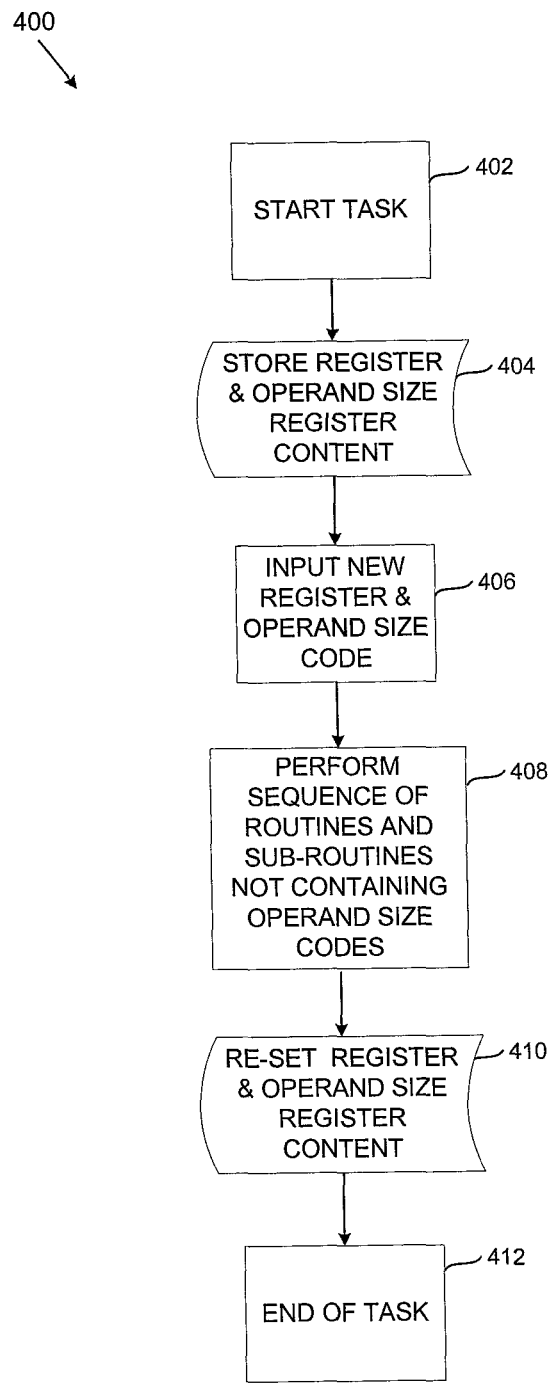
FIG. 4 is a flow chart of a method of processing data in accordance with one embodiment of the invention, given by way of example.

FIG. 4 shows a simplified flow chart of a method 400 of processing data in accordance with an example of an embodiment of the present invention. The method starts a task at 402. At 404, the current content of the ROSR 120 is stored for later re-set at 410. The set of operand size codes are loaded into the ROSR 120 at 406. A sequence of instructions which do not contain operand size information are performed at 408. At 410 the content of the ROSR 120 is re-set so that the calling task can continue or resume in the same context. The task ends at 412.

The methods of embodiments of the invention may also be implemented partially or wholly in a computer program including code portions for performing steps of the method when run on a programmable apparatus, such as a computer system, or enabling a programmable apparatus to perform functions of a device or system according to embodiments of the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-ROM or other storage device, containing data loadable in a memory of a computer system, the data representing the computer program. The data carrier may further be a data connection, such as a telephone cable or a wireless connection. The description of the information processing architecture has been simplified for purposes of illustration, and it is just one of many different types of appropriate architectures that may be used in embodiments of the invention. It will be appreciated that the boundaries between logic blocks are merely illustrative and that alternative embodiments may merge logic blocks or circuit elements or impose an alternate decomposition of functionality upon various logic blocks or circuit elements.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Where the apparatus implementing the present invention is composed of electronic components and circuits known to those skilled in the art, circuit details have not been explained to any greater extent than that considered necessary for the understanding and appreciation of the underlying concepts of the present invention.

Where the context admits, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Where the context admits, illustrated hardware elements may be circuitry located on a single integrated circuit or within a same device or may include a plurality of separate integrated circuits or separate devices interconnected with each other. Also, hardware elements in an embodiment of the invention may be replaced by software or code representations in an embodiment of the invention.

Furthermore, it will be appreciated that boundaries described and shown between the functionality of circuit elements and/or operations in an embodiment of the invention are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In the claims, any reference signs placed between parentheses shall not be construed as limiting the claim. Where the context admits, terms such as "first" and "second" are used to distinguish arbitrarily between the elements such terms describe and these terms are not necessarily intended to indicate temporal or other prioritization of such elements.

The invention claimed is:

1. A method of data processing comprising:
    storing a first set of register size codes for a bank of registers obtained from a register and operand size register (ROSR);
    executing a single instruction for writing a second set of register size codes for the bank of registers into the ROSR;
    executing a first instruction to determine a result based on a first operand and a second operand, wherein the first operand identifies a first register of the bank of registers, wherein a first size of the first register of the bank of registers for the executing the first instruction is determined from a first register size code of the second set of register size codes stored in the ROSR;
    executing a second instruction to determine a result based on a third operand and a fourth operand, wherein the third operand identifies the first register of the bank of registers, wherein the first size of the first register of the bank of registers for the executing the second instruction is determined from the first register size code of the second set of register size codes stored in the ROSR;
    executing a third instruction to determine a result based on a fifth operand and a sixth operand, wherein the fifth operand identifies a second register of the bank of registers, wherein a second size of the second register of the bank of registers for the executing the third instruction is determined from a second register size code of the second set of register size codes stored in the ROSR; and
    executing a second single instruction for restoring the first set of register size codes for the bank of registers to the ROSR.

2. The method of claim 1, wherein a size code is one of an 8-bit, 16-bit and 32-bit indicator.

3. The method of claim 1, wherein a size code is obtained from the ROSR dynamically at runtime of the first, second and third instructions.

4. The method of claim 1, wherein the first instruction is a load instruction.

5. The method of claim 4, wherein the second instruction is a store instruction, wherein the store instruction does not contain a size code.

6. The method of claim 1, wherein the single instruction and the first instruction is generated by a compiler.

7. The method of claim 1, wherein the second set of size codes comprises an 8-bit indicator for the first register based upon the first, second and third instructions including a plurality of character operations.

8. The method of claim 1, wherein the second set of size codes comprises a 16-bit indicator for the first register based upon the first, second and third instructions including a plurality of arithmetic processing operations.

9. The method of claim 1, wherein the first, second and third instructions are included in a subroutine.

10. The method of claim 1, wherein no op code of the first, second and third instructions designates a size code of an operand.

11. The method of claim 1, wherein the the size code for the second operand is the first size code, wherein the first register is a destination operand of the first instruction.

12. A data processor comprising:
    a bank of registers to store values of operands;
    a register and operand size (ROSR) register to store register size codes for the bank of registers; and
    a processor configured to:
        store a first set of register size codes for the hank of registers obtained from the ROSR;
        execute a single instruction to write a second set of codes the bank of registers into the ROSR;
        execute a first instruction to determine a result based on a first operand and a second operand, wherein the first operand identifies a first register of the bank of resisters wherein a first size of the first register of the bank of registers for the execution of the first instruction is determined from a first register size code of the second set of register size codes stored in the ROSR;
        execute a second instruction to determine a result based on a third operand and a fourth operand, wherein the third operand identifies the first register of the bank of registers, wherein the first size of the first register of the bank of registers for the execution of the second instruction is determined from the first register size code of the second set of register size codes stored in the ROSR;
        execute a third instruction to determine a result based on a fifth operand and a sixth operand, wherein the fifth operand identifies a second register of the bank of registers, wherein a second size of the second register of the bank of registers for the execution of the third instruction is determined from a second register size code of the second set of register size codes stored in the ROSR; and
        execute a second single instruction for restoring the first set of register size codes for the bank of registers to the ROSR.

13. The data processor of claim 12, wherein the ROSR receives values of a plurality of size codes from a single operation instruction.

14. The data processor of claim 12, further comprising a multiplexer in communication with the ROSR to provide size code information to the processor.

15. A system comprising the data processor of claim 12, wherein the processor is to receive instructions from a compiler, wherein the instructions, when executed, determine the second set of size codes.

16. The data processor of claim 12, wherein the processor is further configured to execute a third single instruction to write a third set of size codes into the ROSR based upon a task context with character processing; and to execute a fourth single instruction to write a fourth set of size codes into the ROSR based upon a task context with 32-bit operands, wherein the third and fourth sets include a size code for each register of the bank of registers.

17. The data processor of claim 12, wherein the processor stores the first set of size codes and executes the single instruction before entering a subroutine called by a fifth instruction of a task context, and executes the second single instruction before returning to the task context from the subroutine and based upon returning from the subroutine, wherein the second set includes a size code for each register of the bank of registers.

* * * * *